Feb. 28, 1933.  L. N. LYON, SR  1,899,097
DRIVE OR POWER WHEEL FOR AUTOMOBILES
Filed Nov. 3, 1931
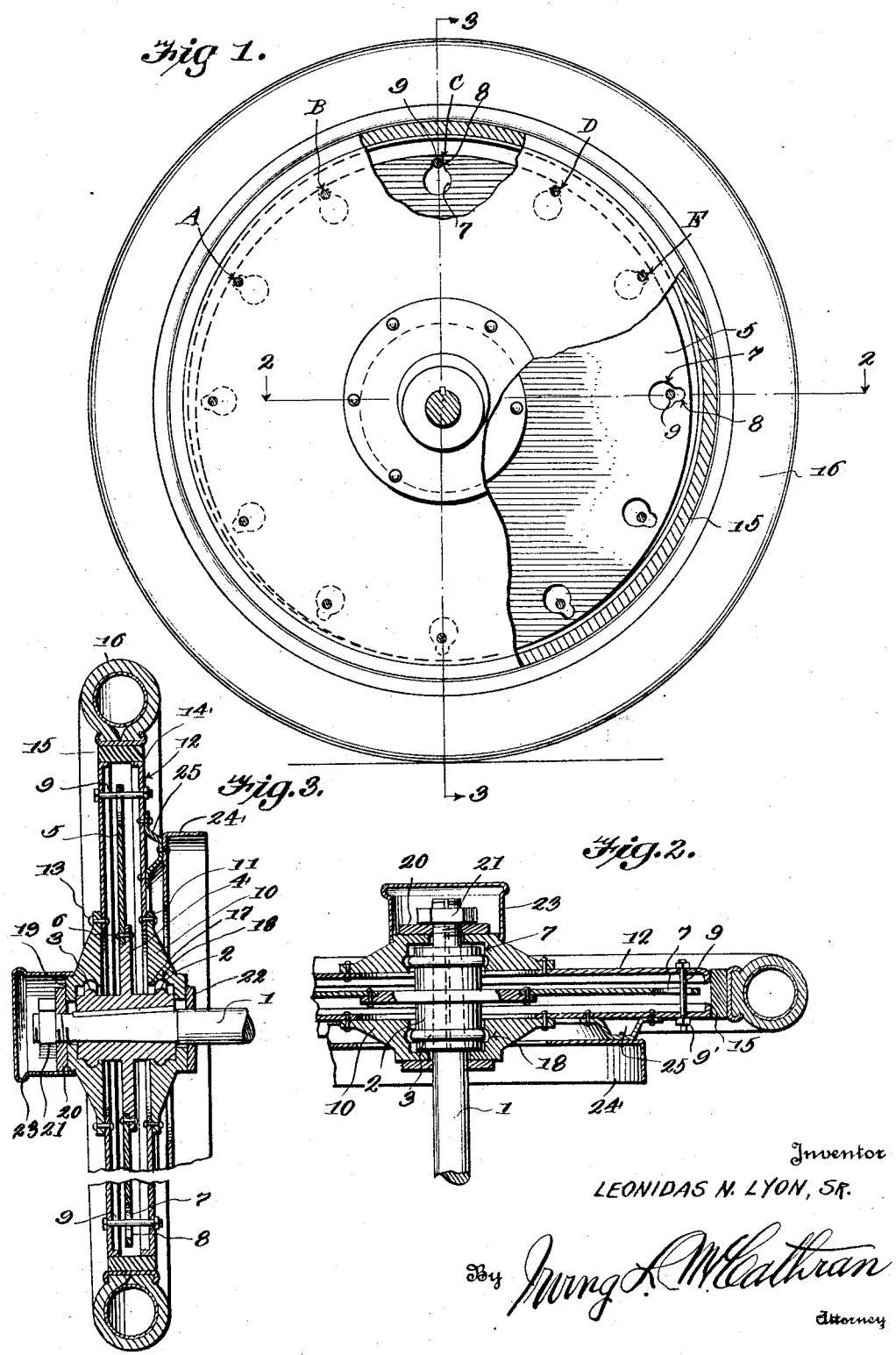
Inventor
LEONIDAS N. LYON, SR.
By Irving A. McCathran
Attorney Patented Feb. 28, 1933

1,899,097

UNITED STATES PATENT OFFICE

LEONIDAS N. LYON, SR., OF HOUSTON, TEXAS

DRIVE OR POWER WHEEL FOR AUTOMOBILES

Application filed November 3, 1931. Serial No. 572,884.

This invention relates to drive or power wheels for automobiles and other motor vehicles, and has for its object the production of a simple and efficient means for increasing the leverage on the outside of the wheel by imparting driving power only to the upper portion of the wheel above the horizontal center of the wheel to efficiently drive the same.

Another object of this invention is the production of a simple and efficient means for supporting the wheel in conjunction with the axle, whereby the driving element may be located near the rim of the wheel, thereby increasing the leverage and at the same time simplifying the driving mechanism of the wheel.

Other objects and advantages of the present invention will appear throughout the following specification and claim.

In the drawing:

Figure 1 is a side elevation of the wheel, the driving bolts being shown in section and certain portions of the wheel being broken away and shown in section;

Figure 2 is a section taken on line 2—2 of Figure 1; and

Figure 3 is a vertical section taken on line 3—3 of Figure 1;

By referring to the drawing, it will be seen that 1 designates the driving axle, to which driving axle is keyed or otherwise secured, the driving spindle or spool 2. This driving spindle or spool 2 is of a tubular structure having a plurality of annular ribs 3 formed upon the periphery thereof near the respective ends of the spindle or spool 2. Centrally of this spindle or spool 2 is formed an annular flange 4 in the nature of a driving flange to which is secured the driving disc 5 by means of suitable bolts or other securing means 6. The driving disc 5 is provided near the periphery thereof with a plurality of circular apertures 7, which apertures 7 are provided near their outer ends with notches 8 for receiving the driving bolts 9, hereinafter described.

Mounted upon the spindle or spool 2 are a plurality of hub plates 10 which fit over the end portions of the spool or spindle 2, as shown in Figure 3, and these hub plates 10 taper toward their outer edges and are provided with annular flanges 11. To these annular flanges 11 of the hub plates 10 are secured the side disc plates 12 of the wheel by means of suitable bolts or other securing means 13. These disc plates 12 are arranged in spaced relation with respect to each other and are provided with inturned flanges 14 which support the rim 15 of the wheel. A suitable tire 16 is supported by the rim.

The hub plates 10 are each provided also with inturned annular flanges 19 which are adapted to overhang the ends of the spindle or spool 2, thereby preventing lateral play of the spool with respect to the hub plates 10. A suitable washer 20 is carried by the end of the axle 1 and is secured in position by means of a suitable nut 21. A similar disc 22 is also carried by the axle 1 and abuts against the opposite hub plates 10, as shown in Figure 3, thereby firmly holding the wheel against movement longitudinally upon the axle 1. A hub cap 23 may also be employed for shielding the nut 21.

A suitable brake band 24 may be secured to one of the wheel discs 12 by means of a securing band 25.

A plurality of driving bolts 9 are arranged in proper spaced relation around the disc plates 12, and near the outer peripheries thereof, and in such position as to work in the circular apertures 7 formed in the driving disc and these driving bolts 9 are adapted to fit in the notches or pockets 8 which are formed near the outer peripheries of the circular apertures 7, as shown in Figure 1, at certain positions of the wheel. The bolts may be secured in any suitable or desired manner to the disc plates 12, such for instance, as by means of suitable nuts 9'.

By considering the drawing it will be seen that the ribs 3 in conjunction with the races 18, will prevent lateral movement of the spindle 2 and force the spindle 2 to revolve parallel with the hub plates 10.

In actual operation when the wheel is in the position shown in Figures 1 and 2, the lower face of the spool or spindle 2 will frictionally engage the lower face of the aperture 17 of the hub plates 10, as shown in Figure 3, and the five upper driving bolts 9 will be forced into the pockets 8 formed upon the outer peripheries of the circular apertures 7, thereby producing a considerable leverage in the driving of the wheel. The lower seven bolts 9 will be drawn out of driving engagement from the lower pockets of the lower circular apertures 7, and all of the driving power will be performed by the upper five bolts illustrated and indicated for convenience by the letters A, B, C, D, and E.

From the foregoing description, it will be seen that a very simple and efficient means has been provided for increasing the driving leverage of the wheel in transferring this driving power from the hub to a point near the rim of the wheel through the medium of the driving bolts which pass transversely of the wheel structure and fit in the notches formed near the outer peripheries of the circular apertures 7.

It should be understood that certain detail changes in the mechanical structure may be employed without departing from the spirit of the invention so long as these changes fall within the scope of the appended claims.

Having described the invention, what is claimed as new is:

1. A wheel of the class described comprising a rim, a driving disc, means for supporting said rim and connecting said rim to said driving disc, a driving hub spindle carried by said driving disc, said driving disc having means for supporting and carrying a driving hub spool, and said driving disc having means capable of imparting driving power only to the upper portion of the wheel above its horizontal center.

2. A wheel of the class described comprising a rim, a driving disc, means for supporting said rim and connecting said rim to said driving disc, a driving hub spindle carried by said driving disc, said driving disc having means for supporting and carrying a driving hub spool, driving bolts carried by said rim and arranged in spaced relation, and said driving disc having a series of circular apertures near the periphery thereof for releasably engaging said driving bolts only in a position above the horizontal center of the wheel and disengaging said bolts on and below the horizontal center of the wheel.

3. A wheel of the class described comprising a rim, a driving hub spool having spaced rounded heads formed upon the periphery thereof, hub plates eccentrically engaging said driving hub spool and having rounded recesses for receiving said heads of said driving hub spool to provide a roller bearing-like action for said hub plates, a driving disc carried by said driving hub spool, and cooperating means provided for said driving disc and wheel for imparting driving power only to the upper portion of the wheel above its horizontal center.

4. A wheel of the class described comprising a rim, a driving hub spindle, means for rotatably supporting said rim upon said spindle, a driving disc carried by said spindle having a plurality of enlarged apertures formed near the periphery thereof, each aperture having a reduced socket formed in its periphery near the outer periphery of said driving disc, the rim being eccentrically mounted with respect to the driving spindle and a series of driving bolts carried by said wheel adjacent said rim and adapted to snugly fit into said sockets formed in the periphery of said enlarged apertures only near the upper portion of the wheel above its horizontal center, the bolts carried by said wheel below the horizontal center thereof being disengaged from the sockets formed in the periphery of said apertures when the bolts in the upper half of the wheel are engaged in said sockets.

In testimony whereof I affix my signature.

LEONIDAS N. LYON, Sr.